United States Patent
Ejzak

(10) Patent No.: US 6,772,112 B1
(45) Date of Patent: Aug. 3, 2004

(54) SYSTEM AND METHOD TO REDUCE SPEECH DELAY AND IMPROVE VOICE QUALITY USING HALF SPEECH BLOCKS

(75) Inventor: Richard Paul Ejzak, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 789 days.

(21) Appl. No.: 09/652,084

(22) Filed: Aug. 31, 2000

Related U.S. Application Data

(60) Provisional application No. 60/170,101, filed on Dec. 10, 1999, and provisional application No. 60/170,155, filed on Dec. 10, 1999.

(51) Int. Cl.[7] ............................................. G10L 19/00
(52) U.S. Cl. ...................................... 704/201; 704/230
(58) Field of Search ............................ 704/201, 200, 704/229, 230

(56) References Cited

U.S. PATENT DOCUMENTS

| 5,517,492 A | | 5/1996 | Spear | |
|---|---|---|---|---|
| 5,553,190 A | * | 9/1996 | Ohya et al. | 704/201 |
| 5,619,496 A | * | 4/1997 | Weir | 370/363 |
| 5,745,492 A | * | 4/1998 | Nakamura et al. | 370/435 |
| 5,778,338 A | | 7/1998 | Jacobs et al. | |
| 5,812,968 A | * | 9/1998 | Hassan et al. | 704/221 |
| 6,604,070 B1 | * | 8/2003 | Gao et al. | 704/222 |

FOREIGN PATENT DOCUMENTS

WO    WO 9619880    6/1996

* cited by examiner

*Primary Examiner*—Richemond Dorvil
*Assistant Examiner*—Donald L. Storm

(57) ABSTRACT

A system and method for wireless communication using half speech blocks which results in half the number of coded bits as a full speech block after coding. The half speech block can be created with a lower speech rate mode of an adaptive multi-rate vocoder. The reliability of the first speech frame is somewhat lower; however, this is not expected to significantly impact voice quality. Further, reliability can be compensated for by increasing power some on the less reliable blocks.

12 Claims, 18 Drawing Sheets

CFSB(i-j)  Coded Full Speech Block for speech interleaved over bursts i to j
S          SACCH burst
CHSB(i-j)  Coded Half Speech Block for speech interleaved over bursts i to j Full rate speech channel; start of a talkspurt is shown for the full rate speech user assuming 8 burst chain interleaving with the use of a half speech block.

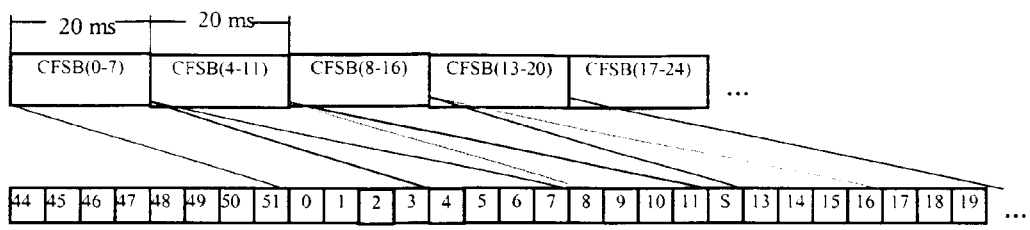

CFSB(i-j)  Coded Full Speech Block for speech interleaved over bursts i to j
S          SACCH burst for half rate speech traffic channel Full rate speech channel; start of a talkspurt is shown for the full rate speech user assuming 8 burst chain interleaving without a half speech block.

FIG. 2

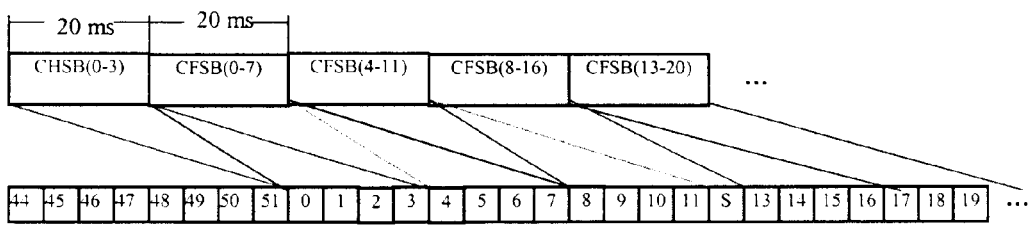

CFSB(i-j)  Coded Full Speech Block for speech interleaved over bursts i to j
S          SACCH burst
CHSB(i-j)  Coded Half Speech Block for speech interleaved over bursts i to j Full rate speech channel; start of a talkspurt is shown for the full rate speech user assuming 8 burst chain interleaving with the use of a half speech block.

FIG. 3

HB(i,j) Half Block for speech coded and interleaved over bursts i and j
FB(i,j,k,l) Full Block for speech coded and interleaved over bursts i, j, k and l
S SACCH burst for half rate speech traffic channel
RB Radio Block Half rate speech channel; start of a talkspurt is shown for the half rate speech user assuming 4 burst chain interleaving with the use of a half speech block.

Optimized Speech           RT Data and nRT Data
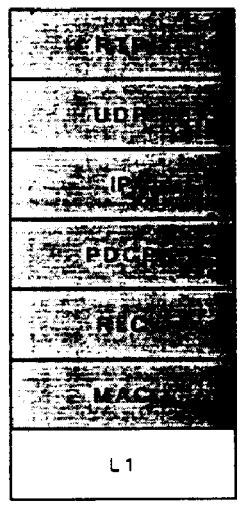
(a)
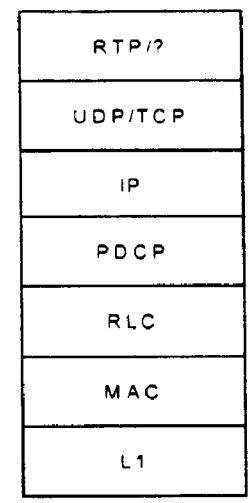
(b)
Note:; Shaded Parts are eliminated from the overhead of speech frames
FIG. 5

| RT TBF State | Traffic Activity | | TCH Channel Assignment | | Control Channel Assignment | |
|---|---|---|---|---|---|---|
| | UL | DL | UL | DL | UL | DL |
| TBF Inactive | idle | idle | | | FRACH FACKCH UPRCH UBMCH | FASSCH DPRCH DBMCH |
| UL Active | active | idle | UTCH/ (B)FACCH / MSACCH | | FRACH FACKCH UBMCH | FASSCH DPRCH DBMCH |
| DL Active | idle | active | | DTCH/ (B)FACCH / MSACCH | FRACH FACKCH UPRCH UBMCH | FASSCH DBMCH |
| UL + DL Active | active | active | UTCH/ (B)FACCH / MSACCH | DTCH/ (B)FACCH / MSACCH | FRACH FACKCH UBMCH | FASSCH DBMCH |

FIG. 6

| Procedures | RT TBF State | | | |
|---|---|---|---|---|
| | Inactive | UL Active | DL Active | DL+UL Active |
| Reassign DL Control (RDC) | x | x | | |
| Reassign UL Control (RUC) | x | | x | |
| Start DL Traffic (SDT) | x | x | | |
| End DL Traffic (EDT) | | | x | x |
| Reassign DL Traffic (RDT) | | | x | x |
| Start UL Traffic (SUT) | x | | x | |
| End UL Traffic (EUT) | | x | | x |
| Reassign UL Traffic (RUT) | | x | | x |
| End TBF (ET) | x | x | x | x |
| Start new TBF (ST) | x | x | x | x |

FIG. 7

| Message | Channel During Uplink Traffic | Channel with no Uplink Traffic |
| --- | --- | --- |
| Access Request | BFACCH | FRACH |
| Acknowledge to Assignment | BFACCH | FACKCH |
| AMR Mode Request | UTCH | UPRCH |
| SID Update | N/A | UPRCH |
| Neighbor Measurement Report | MSACCH | UPRCH |
| RLC Signaling | UTCH | UBMCH |
| End TBF Request | BFACCH | FRACH |

FIG. 8

| Message | Channel During DL Traffic | Channel with no DL Traffic |
|---|---|---|
| Assignment (all) | BFACCH | FASSCH |
| AMR Mode Command | DTCH | DPRCH |
| SID Update | N/A | DPRCH |
| Handover Directives | FACCH | DBMCH |
| RLC Signaling | DTCH | DBMCH |
| Timing Advance | MSACCH | DPRCH |
| Power Control | MSACCH | DPRCH |
| End TBF Command | BFACCH | FASSCH |

FIG. 9

| Downlink Burst Message | Information Elements |
|---|---|
| Assign UTCH | ARI, DMT, TBFI, CID, CTS, PH, SD |
| Deferred Assign UTCH | ARI, DMT, TBFI, RRBP, delay |
| Assign DTCH | ARI, DMT, TBFI, RRBP, CID, CTS, PH, SD |
| Assign UPRCH | ARI, DMT, RRBP, CID, CTS, OFF |
| Assign DPRCH | ARI, DMT, RRBP, CID, CTS, OFF |
| Assign FRACH | ARI, DMT, RRBP, CID, CTS, PH |
| Assign FACKCH | ARI, DMT, RRBP, CID, CTS, PH |
| Assign FASSCH | ARI, DMT, RRBP, CID, CTS, PH |
| End TBF Command | ARI, DMT, TBFI, RRBP, reason |

FIG. 10

| Uplink Burst Message | Information Elements |
|---|---|
| Access Request | ARI, UMT, TBFI |
| Acknowledge UTCH | ARI, UMT, TBFI |
| Acknowledge DTCH | ARI, UMT, TBFI |
| Acknowledge UPRCH | ARI, UMT, TBFI |
| Acknowledge DPRCH | ARI, UMT, TBFI |
| Acknowledge FRACH | ARI, UMT, TBFI |
| Acknowledge FACKCH | ARI, UMT, TBFI |
| Acknowledge FASSCH | ARI, UMT, TBFI |
| Acknowledge End TBF | ARI, UMT, TBFI |
| End TBF Request | ARI, UMT, TBFI, reason |

FIG. 11

Comparison of block error rate for half speech block (transmitted over 2 bursts) and full speech block. (transmitted over 4 bursts)

SYSTEM AND METHOD TO REDUCE SPEECH DELAY AND IMPROVE VOICE QUALITY USING HALF SPEECH BLOCKS

CROSS-REFERENCE TO RELATED APPLICATION

This application claims priority of Provisional Application Serial No. 60/170,101, which was filed Dec. 10, 1999.

This application is related to K. Balachandran 13-18-18-40-1, Provisional Application Serial No. 60/170,155, filed Dec. 10, 1999.

TECHNICAL FIELD

The invention relates to relates generally to wireless communication networks and, more particularly, to a method for efficiently providing voice communications over wireless and/or cellular networks.

DESCRIPTION OF THE PRIOR ART

The widespread growing popularity of the Internet has encouraged wireless communication system developers to continually improve the data communication capabilities of their systems. In response to this need, various standards bodies have formulated and continue to formulate new third generation (3G) standards which support higher data rates. For example, standards organizations such as the European Telecommunications Standards Institute (ETSI), the Association of Radio Industries and Broadcasting (ARIB) and the Telecommunications Industry Association (TIA) are continually developing standards to support faster and more efficient wireless communications.

Similarly, the wireless communications industry is often developing and implementing new wireless transmission protocols which provide faster, more robust and more efficient data communications over air interfaces. For example, GSM continues to evolve. In another example, general packet radio service (GPRS) has been developed as a packet-switched upgrade for the well known time division multiple access (TDMA) system. In a further advancement in the art, enhanced GPRS (EGPRS) has also been developed.

Presently, GSM, GPRS and EGPRS physical layers have the following characteristics: a carrier that consists of two 200 kHz bandwidth segments of the allocated GSM spectrum, 45 MHz apart, one for the downlink and one for the uplink; time is divided into frames with a multiframe comprising 52 frames and spans 240 msec.; each frame consists of 8 time slots; one slot on one carrier is referred to as a GSM channel; there is a one-to-one correspondence between a slot (numbered j, j=0, ... 7) on a downlink carrier at frequency (f) and an uplink slot (numbered j) on the corresponding uplink carrier (f+45 MHz); a transmission in a slot is referred to as a burst; and a block consists of a predefined set of four bursts on the same slot.

Radio access bearers are currently being designed in order to provide real time services in a next phase of EGPRS. However, recent approaches rely on using the existing burst based random access channels on the uplink and block based assignment channels on the downlink. Each block is interleaved and transmitted over 4 bursts (20 msec). However, investigation has shown systems based on 20 msec granularity require at least a 60 msec delay budget. Also, the investigation has shown transmission of assignments to multiple mobile stations within a single 20 msec message often is inefficient due to low packing and is incompatible with interference reduction techniques such as smart antennas and power control. As a result, block based assignment channels according to the recent approaches can result in excessive control overhead and excessive delays for statistical multiplexing of real time transfers (e.g. voice talkspurts). It is desirable to provide a better access and assignment system and method.

In order to efficiently use the high capacity of a wireless or a cellular data telecommunication system (e.g., GPRS or EGPRS), it is also desirable to provide voice and data multiplexing capability as well as statistical multiplexing of voice users. Currently these cellular data telecommunication systems are designed to provide primarily non-real time (delay insensitive) data services. Conversational speech and other real time interactive communications are delay sensitive and require the design of new control mechanisms to provide fast control channels to meet the critical delay requirements. Therefore, there is a need to redesign wireless data telecommunication systems to provide such control capabilities to make them suitable for multiplexing both non-real-time services and real-time services, such as conversational speech.

For cellular systems based on IS-136 and GSM standards existing before December 1999, chain interleaving was used in order to increase the interleaving depth without significantly increasing the delay. However, when chain interleaving according to those standards was used, half of the available bits over a 20 msec. transmission interval (e.g. first 4 GSM bursts) at the start and end of a voice talkspurt do not carry coded speech and therefore were wasted. Also, the first 20 msec. speech frame became available at the receiver only after 40 msec (if 8 burst interleaving was used as in the GSM full rate speech channels). The use of statistical multiplexing would improve traffic, but statistical multiplexing requires fast assignment of traffic channels at the beginning of each talkspurt. An additional problem is that the control channel procedures for access and assignment take time and introduce delays in the play out of speech at the receiver. These delays are in addition to the signal processing and transport delays that are inherent in wireless and cellular communications. It is desirable to keep one way and round-trip speech delays very short in order to provide high quality natural conversations.

SUMMARY OF THE INVENTION

Briefly stated in accordance with one aspect of the invention, the aforementioned problems are addressed and an advance in the art achieved by providing a wireless speech system using chain interleaving of speech frames where one or more speech frames are each replaced with a corresponding half speech frame that is encoded and interleaved over half the distance of the original speech frame.

In accordance with one aspect of the invention, the aforementioned problems are addressed and an advance in the art achieved by providing a wireless speech system using chain interleaving of speech frames where one or more speech frames are each replaced with a corresponding half speech frame that is encoded and interleaved over half the distance of the original speech frame. Each half speech frame is encoded and interleaved over the last half of the interleaving period of the full speech frame that the half speech frame replaced.

In accordance with one aspect of the invention, the aforementioned problems are addressed and an advance in the art achieved by providing a wireless speech system using chain interleaving of speech frames where one or more speech frames are each replaced with a corresponding half speech frame that is encoded and interleaved over half the distance of the original speech frame. Each half speech frame is encoded and interleaved over the last half of the interleaving period of the full speech frame that the half speech frame replaced. Further, the half speech frames correspond to the beginning of a talk spurt, and where nothing is transmitted during the first half of the interleaving period of the corresponding full speech frames.

In accordance with another aspect of the invention, the aforementioned problems are addressed and an advance in the art achieved by providing a system that uses a half speech block to reduce speech play-out delay to improve the quality of conversational speech. The half speech block results in half the number of coded bits as a full speech block after coding. This half speech block is encoded by a lower speech rate mode of an adaptive multi-rate vocoder.

BRIEF DESCRIPTION OF THE DRAWING

FIG. 2 illustrates a full rate speech channel with a start of a talkspurt for full rate speech assuming 8 burst chain interleaving without a half speech block.

FIG. 3 illustrates a full rate speech channel with a start of a talkspurt for full rate speech assuming 8 burst chain interleaving with the use of a half speech block.

FIG. 5 illustrates the user plane protocol stack for Pre-GERAN and GERAN systems.

FIG. 6 illustrates a state table of a control system according to the present invention.

FIG. 7 illustrates a RT TBF State Diagram in table form.

FIG. 8 illustrates message and uplink interaction in tabular form.

FIG. 9 illustrates a summary of downlink signaling and control messages in tabular form.

FIG. 10 illustrates downlink burst message content in tabular form.

FIG. 11 illustrates uplink burst message content in tabular form.

DETAILED DESCRIPTION

Figure 1:
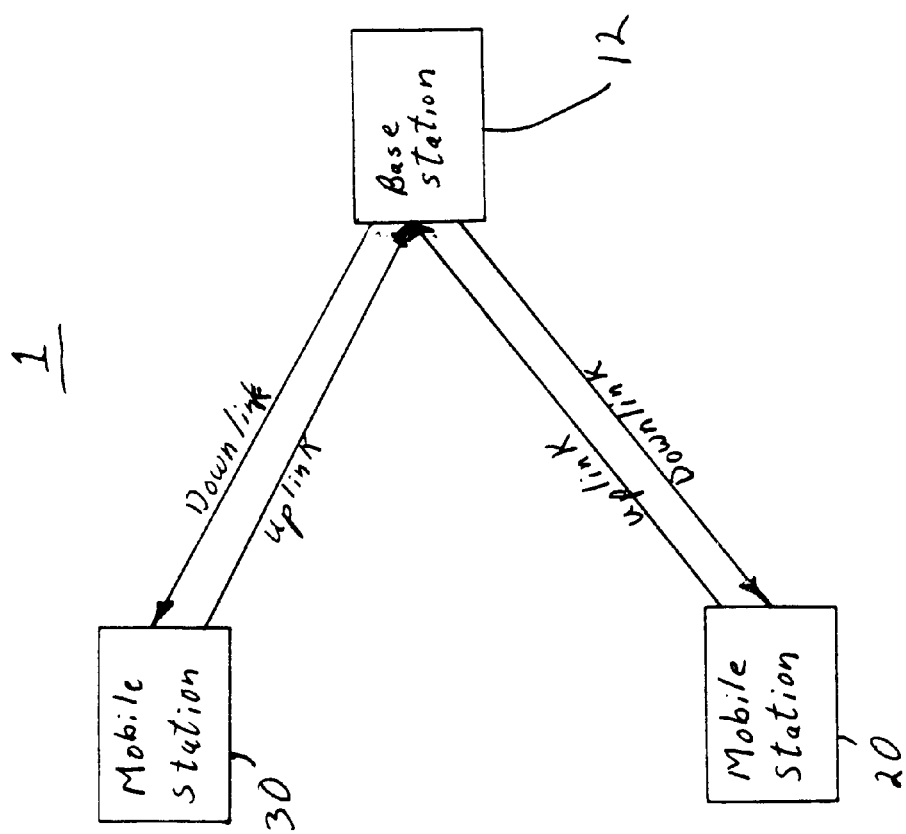
FIG. 1 is a block diagram of a GERAN system with mobile station receiver-transmitters and a central base station receiver-transmitter.

Referring now to FIG. 1, a system 1 is shown. System 1 in a preferred embodiment, is a GSM Enhanced-General-Packet-Radio-Service Radio Access Network (GERAN) as described herein. GERAN 1 has a central or base station 12 which has a transmitter, a receiver and an antenna (not shown) as a base station typically has. Base station 12 is part of the GERAN 1. GERAN 1 is used to communicate with and carry message traffic between a caller on a mobile station 20, and in a preferred embodiment to callers of all kinds and mobile stations, such as mobile stations 20, 30. The present invention provides new traffic and control channels that are completely compatible with beam forming and power control techniques, enabling their use for all new traffic and control channels.

The present invention has unidirectional traffic and control channels. The benefits of statistical multiplexing are achieved through the application of the following principles. All new control and traffic channels are unidirectional, with independent frequency and slot allocation in the uplink and downlink directions. Available resources can be dynamically allocated as necessary to traffic and control channel functions. This allows for maximum flexibility in allocation of available resources.

In previously known GSM, GPRS and EGPRS Phase 1, a channel consists of one time slot on a 200 kHz carrier at frequency f for the downlink and a corresponding slot on a 200 kHz carrier at (f+45 MHz) on the uplink. Breaking this historical association between uplink and downlink channels allows for statistical multiplexing of speech, in particular, since the uplink and downlink resource demands occur independently. Breaking the historical association between uplink and downlink maximizes the resource pool available for assignment when new data or speech becomes available for transmission.

A primary consideration for any GERAN method and system must be the impact on half-duplex mobiles, given their cost advantages. (Half duplex mobiles in TDMA systems transmit and receive in different time slots and therefore do not require a duplexer). In the previous GSM, GPRS and EGPRS Phase 1, corresponding time slots on the uplink and downlink were chosen in such a way that they were compatible with half-duplex operation. With statistical multiplexing, the system can be specifically design for maximum flexibility of operation with half duplex mobiles, when both the uplink and downlink time slots are dynamically assigned The new control and traffic channels are designed to support half-duplex mobiles in a manner that maximizes the pool of traffic and control channel resources available for assignment to these mobiles.

In what follows, a system using half speech block which results in half the number of coded bits as a full speech block after coding is described. The half speech block can be created with a lower speech rate mode, for example, in the case of the GSM Adaptive Multi-rate vocoder, or similar coding device. The reliability of the first speech frame is somewhat lower than subsequent frames; however, this is not expected to significantly impact voice quality. Simulated results from an example design is in the performance section.

In the case of a full rate traffic channel a full speech block is transmitted chain interleaved over eight bursts (40 msec). The half speech block is transmitted over four bursts in 20 msec, rather than the 40 msec. Similarly, for a half-rate channel, a full speech block is transmitted chain interleaved over four alternate bursts (over 40 msec). The half speech block is transmitted over two alternate bursts in 20 msec, rather than the 40 msec. FIG. 2 shows the case of a talkspurt beginning without the use of a half speech block, while the reduction in play-out delay with a half speech block is shown in FIG. 3.

Simulations have shown that the advantages of the half speech block system and method approach. A first advantage is that it reduces speech play out delay by 20 msec. FIGS. 2 and 3 show the delay at the start of a talkspurt when chain interleaving is carried out under current assumptions (using only full speech blocks) and with the use of a half speech block, respectively. It can be noted that with the half speech block, the first speech frame becomes available at the receiver within 20 msec. instead of 40 msec. This is a significant improvement, particularly while carrying out statistical multiplexing of voice users. A second advantage is that it can be used for "dim and burst" signaling of speech at any time within a talkspurt. For handoffs in current systems the fast associated control channel (FACCH) is used. The FACCH replaces a speech block on the traffic channel with control information. With the half speech block, only half of the traffic channel bits are used for speech information, leaving the remaining bits available for control messages. Since this dim-and-burst FACCH occurs infrequently, the effect on speech quality is imperceptible. A third advantage is that it can be used to harvest unused bits at the beginning and end of every talkspurt thereby reducing the activity period marginally. This is also useful with circuit voice where discontinuous transmission (DTX) is used in order to reduce interference.

Figure 4:
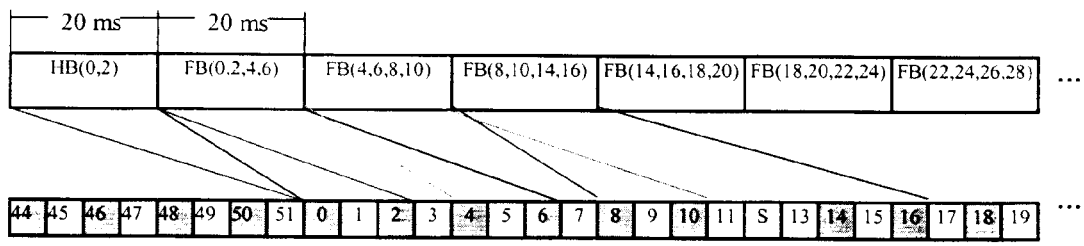
FIG. 4 illustrates a half rate speech channel with a start of a talkspurt for half rate speech assuming 4 burst chain interleaving with the use of a half speech block where a half rate channel is made up of alternate bursts of a full rate channel.

FIG. 4 shows the applicability of the half speech block to half rate channels described immediately above. In FIG. 4, a half rate channel comprises alternate bursts of a full rate channel.

Application of System and Method to Reduce Speech Delay and Improve Voice Quality Using Half Speech Blocks to GERAN (GSM EDGE (Enhanced General Packet Radio Service) Radio Access Network)

The system and method to reduce speech delay and improve voice quality using half speech blocks uses GERAN systems and methods. GERAN document 2E99-584 in pertinent part reads:

Introduction and Scope

This GERAN description describes the key new ideas needed to introduce statistical multiplexing of all bearer classes on the GERAN air interface for delivery over the packet-switched network. It focuses only on the support of overall UMTS service requirements, and does not address network architecture issues or circuit-switched services.

The central new service requirement for GERAN (compared to EGPRS Phase 1) is the support of speech service using the packet-switched backbone network. The focus of the document is the definition of new traffic and control channels to support statistical multiplexing of speech, real-time data, and non-real-time data, and the corresponding new MAC procedures that are needed to guarantee QoS.

List of Acronyms used herein

| | |
|---|---|
| AMR | Adaptive Multi-Rate |
| ARI | Access Request Identifier |
| BCCH | Broadcast Control Channel |
| BEP | Bit Error Probability |
| BFACCH | Burst-based FACCH |
| CCCH | Common Control Channel |
| CID | Carrier Identifier |
| CTS | Carrier Time Slot |
| DBMCH | Downlink Block Message Channel |
| DFACCH | Dim-and-Burst FACCH |
| DMT | Downlink (Burst) Message Type |
| DPRCH | Downlink Periodic Reservation Channel |
| DTCH/FS | Downlink Traffic Channel for Full Rate Speech |
| DTCH/HS | Downlink Traffic Channel for Half Rate Speech |
| DTCH/FD | Downlink Traffic Channel for Full Rate Data |
| DTCH/HD | Downlink Traffic Channel for Half Rate Data |
| EDT | End Downlink Traffic |
| EEP | Equal Error Protection |
| EGPRS | Enhanced General Packet Radio Service |
| EUT | End Uplink Traffic |
| FACCH | Fast Associated Control Channel |
| FACKCH | Fast Acknowledgment Channel |
| FASSCH | Fast Assignment Channel |
| FFS | For Further Study |
| FR | Full-Rate |
| FRACH | Fast Random Access Channel |
| GERAN | GSM/EDGE Radio Access Network |
| HR | Half-Rate |
| IP | Internet Protocol |
| L1 | Layer 1 (Physical Layer) |
| MAC | Medium Access Control |
| MCS | Modulation and Coding Scheme |
| MR | Measurement Report |
| MS | Mobile Station |
| MSACCH | Modified Slow Associated Control Channel |
| NRT | Non-Real Time |
| OFF | Offset in Frames |
| PBCCH | Packet Broadcast Control Channel |
| PCCCH | Packet Common Control Channel |
| PDCP | Packet Data Convergence Protocol |
| PH | Phase |
| QoS | Quality of Service |
| RAB | Radio Access Bearer |
| RAN | Radio Access Network |
| RDC | Reassign Downlink Control |
| RDT | Reassign Downlink Traffic |
| RLC | Radio Link Control |
| RR | Radio Resource Management |
| RRBP | Relative Reserved Burst Period |
| RT | Real Time |
| RTP | Real Time Protocol |
| RUC | Reassign Uplink Control |
| RUT | Reassign Uplink Traffic |
| SACCH | Slow Associated Control Channel |
| SD | Start Delay |
| SDT | Start Downlink Traffic |
| SID | Silence Descriptor |
| SUT | Start Uplink Traffic |
| TBF | Temporary Block Flow |
| TBFI | Temporary Block Flow Identifier |
| TCP | Transport Control Protocol |
| TFI | Temporary Flow Identifier |
| TS | Time Slot |
| UDP | User Datagram Protocol |
| UEP | Unequal Error Protection |
| UBMCH | Uplink Block Message Channel |
| UPRCH | Uplink Periodic Reservation Channel |
| UMT | Uplink (Burst) Message Type |
| UMTS | Universal Mobile Telecommunications System |
| USF | Uplink State Flag |
| UTCH/FS | Uplink Traffic Channel for Full Rate Speech |
| UTCH/HS | Uplink Traffic Channel for Half Rate Speech |

-continued

List of Acronyms used herein

| | |
|---|---|
| UTCH/FD | Uplink Traffic Channel for Full Rate Data |
| UTCH/HD | Uplink Traffic Channel for Half Rate Data |
| UTRAN | UMTS Terrestrial Radio Access Network |
| VAD | Voice Activity Detection |

Service Requirements

Service requirements for GERAN are based on those of UMTS, with the addition of an optimized speech service based on GSM/AMR. These requirements describe the radio bearer classes, the need for parallel bearer flows, handover, and alignment with UMTS core network. Specific error, throughput, and delay requirements for each bearer class are FFS, but range of capabilities is clear from current UMTS requirements.

Support of Radio Bearer Classes in Alignment with UMTS

The UMTS radio bearer classes for conversational, streaming, interactive, and background services cover a range of real-time and non-real-time data services with a wide range of error, throughput, and delay requirements. The GERAN requirements for these services will be aligned with UMTS with adjustments as necessary to capture unique characteristics of the GERAN.

Voice service requirements are based on those of GSM/AMR. A GERAN radio bearer class will be specifically optimized for voice service.

Support for Parallel Bearer Flows with Different QoS

The GERAN shall support up to three parallel bidirectional bearer flows with different QoS requirements. This capability will enable support of simultaneous voice and data service as well as multimedia service.

Handover Requirement for RT Services

Voice and real-time data services have QoS characteristics not supported by existing EGPRS reselection procedures. The GERAN shall include procedures to support maintenance of acceptable (TBD) QoS during network-assisted handover procedures for voice and real-time data services. The details of these handover procedures are outside the scope of this document.

Alignment with UMTS Core Network

The GERAN shall conform to the core network interface requirements established for UMTS with only those changes necessary to adapt to unique characteristics of the GERAN. In particular, this requires that the GERAN provide the Iu-ps interface to the UMTS core network.

Targeted Configuration

Blocking Limited Deployment

This concept proposal is optimized for blocking limited deployment, where the greatest capacity is achieved by utilizing available traffic-carrying channels to the fullest degree. In a blocking limited deployment, traditional circuit channels for delivery of voice and real-time data services are inefficient due to significant periods of "dead time" during a typical flow. For voice service with a voice activity factor approximately 40%, there is considerable potential to increase overall capacity with statistical multiplexing of traffic channel resources.

Interference Limited Deployment

Since an interference-limited system must operate at some fraction of its channel capacity to achieve acceptable aggregate performance, statistical multiplexing typically offers little or no capacity advantage. However, interference-limited deployment (e.g. 1/3 reuse) becomes blocking limited with techniques like beam forming and power control. It is more appropriate to optimize the GERAN for deployment configurations that take advantage of the application of the latest interference management techniques, which make them more blocking limited. This approach assures that the greatest capacity benefits are available in all configurations.

Less Aggressive Reuse (e.g. 4/12) Preferred When Spectrum Available

Blocking limited deployment is and will be common for the foreseeable future. Blocking limited deployment is preferred in areas not limited by availability of spectrum. It is also preferred in areas where uniform quality of service is a requirement, since coverage "holes" become more common when operating in interference limited conditions.

All New Traffic and Control Channels

This invention introduces new traffic and control channels that are completely compatible with beam forming and power control techniques, enabling their use for all new traffic and control channels. This is achieved by designing all communication on these channels to be point-to-point. There are no multicast or broadcast control messages or control fields in any downlink transmissions. In particular, no USF is required in any downlink burst.

Multiplexing Principles

The benefits of statistical multiplexing are achieved through the application of the following principles.

Unidirectional Traffic and Control Channels

All new control and traffic channels are unidirectional, with independent frequency and slot allocation in the uplink and downlink directions. Available resources can be dynamically allocated as necessary to traffic and control channel functions. This allows for maximum flexibility in allocation of available resources. Breaking the historical association between uplink and downlink channels is necessary for statistical multiplexing of speech, in particular, since the uplink and downlink resource demands occur independently. Breaking the association between uplink and downlink maximizes the resource pool available for assignment when new data or speech becomes available for transmission.

A primary consideration for any new GERAN concepts must be the impact on half-duplex mobiles, given their cost advantages. A companion paper specifically addresses half-duplex mobile consideration. The new control and traffic channels are specifically designed to support half-duplex mobiles in a manner that maximizes the pool of traffic and control channel resources available for assignment to these mobiles.

Another consideration for further study is the impact of variable uplink/downlink carrier separation on mobiles.

EGPRS Phase 1 and Phase 2 Traffic on Different Time Slots

Because of the need to allocate uplink and downlink channels independently, it is not possible to multiplex EGPRS Phase 1 and Phase 2 (GERAN) traffic on the same time slot. This traffic must be segregated onto separate time slots at any one time.

Multiplexing Different QoS Classes

This proposal supports the multiplexing of all QoS classes onto the same channels. The same uplink an downlink resource pools are shared among all flows, regardless of their QoS class, maximizing the advantages of statistical multiplexing.

Operation of TBF Establishment

The concept of a Temporary Block Flow (TBF) of GPRS/EGPRS is enhanced in the GERAN to have a unique profile with direction, QoS, and protocol attributes.

Negotiation of TBF Profile

Before establishment of any TBF between a mobile and the network, it camps on the CCCH or PCCCH in the current cell, and is governed by procedures currently defined in EGPRS. When the first TBF is established, its attributes are defined as follows:

The TBF is either unidirectional (uplink or downlink) or bidirectional. A voice TBF would typically be bidirectional. A data TBF could be either unidirectional or bidirectional. Data traffic requiring any significant exchange, such as upper layer acknowledgments, could be bidirectional, thus saving the overhead of repeated TBF establishment for periodic traffic. The TBF is assigned QoS attributes consistent with the desired service quality and bearer class. Given the assigned QoS attributes, the TBF may also be eligible for network-directed handover procedures to minimize service disruption while switching between two cells.

The TBF is assigned protocol attributes. For example, for voice service the TBF uses physical layer channel coding optimized for voice, and eliminates headers associated with other protocol layers. Data services will typically require physical layer channel coding optimized for data and the presence of the headers for all protocol layers to control more complex protocol functions.

MAC Procedures for Established TBF

Once the first TBF is established, the mobile remains on the new RT traffic and control channels, regardless of the presence or absence of data to send, until all TBFs for the mobile are released. Each TBF remains valid regardless of activity until it either times out or is explicitly released by the network.

Channels for Fast Resource Assignment

When there is no data transfer in the downlink direction (no downlink traffic channel is assigned to the TBF), the mobile must monitor a common downlink control channel for fast resource assignment directives. These assignment directives assign traffic channel resources to the TBF as needed to support data transfer with the agreed-to QoS attributes.

When the TBF has an active downlink traffic channel assignment, it typically monitors the same physical channel for fast associated control channel messages with alternative assignment directives. As an alternative for mobiles with adequate multi-slot capability, the mobile may be required to monitor both the downlink traffic channel for user data and a common downlink control channel for fast assignment directives.

When a mobile has more than one TBF active in the downlink direction, it may be required to monitor either a common downlink control channel and/or one (or more) of the downlink traffic channels for fast assignment directives.

Traffic Channel Assignment

When the TBF requires a downlink traffic channel for data transfer, the network sends a fast assignment directive to the mobile to allocate a downlink traffic channel for the data transfer.

When the TBF requires an uplink traffic channel for data transfer, the mobile sends a fast access request on an uplink fast access control channel. The network responds with a fast assignment directive to allocate the necessary uplink resource.

In all cases, since QoS and protocol attributes have been negotiated during establishment of the TBF, there is no ambiguity as to the parameters of the resource request or assignment. These attributes do not change from one resource request or assignment to the next during a TBF.

Timing Alignment and Power Control

For as long as a mobile has at least one TBF established, it remains in timing alignment and under power control. This allows for all access bursts to be of normal length, since abbreviated bursts are not needed to allow for misalignment. This also avoids the extra overhead of performing these functions at the beginning of each traffic channel assignment.

Protocol and Architecture

To support optimized speech, RT and NRT users over packet bearer, two different protocol stacks are proposed to meet the requirements of optimized speech and data bearers, as shown in FIG. 5.

The protocol stack used for a particular TBF is negotiated at the TBF setup along with the QoS attributes. For optimized speech bearer, a dedicated unidirectional traffic channel is allocated to a speech TBF during a talk spurt. Hence no RLC/MAC header is used. The IP/UDP/RTP header information is exchanged at speech TBF setup and is, therefore, eliminated from the speech frame transmission over the RF interface. So, the entire shaded area of the protocol stack is dispensed with for optimized speech users, but not for RT and NRT data users. For RT and NRT data users, the EGPRS Phase 2 protocol stack is kept. Possible optimization for RT data bearers is FFS.

RLC

The GERAN will reuse the EGPRS Phase 1 RLC with only those extensions needed to adapt RLC procedures to the new RT traffic and control channels.

MAC

The RT MAC is new for the GERAN, based on the fast access and assignment procedures of this proposal.

Radio Interface Aspects

The GERAN Layer 1 is an enhanced version of the EGPRS Phase 1 Layer 1. Enhancements are related to the introduction of new types of traffic and control channels, as described below.

Traffic Channel Design

All traffic channels in GERAN are considered to be unidirectional channels. Chain interleaving is done on speech traffic channels and block interleaving for data. Half-rate traffic channels use alternate bursts. This has a significant multiplexing advantage for half-duplex mobiles. In the case of NRT data, it permits ease of multiplexing with RT data and voice.

Speech, RT and NRT users may share a time slot by being assigned to two different half-rate channels on the same slot. A half-rate or a full-rate traffic channel is allocated to a specific speech or data user for the duration of a talk spurt or "data spurt". No headers or stealing bits are required for the receiver to distinguish between these traffic channels. For data channels, stealing bits and header formats are used as in EGPRS Phase I, but the USF is eliminated on the downlink.

All traffic channel assignments are through messaging on the new control channels (including TCH associated control channels).

Speech Traffic Channel Design Principles

Speech traffic channels are based on supporting the GSM/AMR modes on full-rate and half-rate channels. The full-rate channel coding for the GSM/AMR modes is the same as in current GSM/AMR. The channel coding for half-rate AMR modes will be based on either 8PSK or QPSK modulation, depending on the results of separates studies.

Interleaving

Interleaving in all cases will be chain interleaving over 40 msec, as in GSM/AMR. For a full-rate traffic channel the interleaving is over 8 radio bursts in 40 msec, with a chaining overlap of 4 radio bursts in 20 msec. For a half-rate traffic channel, the interleaving is over 4 radio bursts spaced over 40 msec, with a chaining overlap of 2 radio bursts in 20 msec. This half-rate interleaving mode is sometimes described as 0246/1357, to describe the use of alternate bursts for each of two half-rate channels over the 8 bursts in a 40 msec interval. The alternative of block interleaving of 2 speech frames over 4 consecutive bursts in 20 msec intervals alternating between two half-rate channels is sometimes called 0123/4567 interleaving.

Compatibility with Half-Duplex Mobiles

Half-duplex mobiles typically have severe constraints on the combination of uplink and downlink channels that they can support. This is an important consideration since statistical multiplexing works more efficiently with a larger pool of resources available for allocation. Investigation has shown that the best statistical multiplexing efficiency is achieved for half-duplex mobiles by defining all half-rate traffic and control channels to use no more than every other burst on any one time slot. This burst allocation for half-rate speech channels is discussed below.

Headers

Since the entire channel (either full-rate or half-rate) is dedicated to a TBF for the length of a talk spurt, there is no need for additional header beyond what is in existing GSM/AMR.

Half Speech Block

With chain interleaving, half of the information transmitted in the first and last 20 msec intervals of a talk spurt is typically unusable. Since AMR has multiple compatible modes of operation with different sizes of speech frames every 20 msec, it is possible to define new channel coding for these currently unused bits to transmit special speech frames. For example, with the 7.4 kbps mode of operation, it is possible to specify alternative channel coding on the first block of unused bits to encode a single 4.75 kbps speech frame. The performance of this half speech block is somewhat worse than the performance of the remaining speech frames, but the overall impact on the quality of a typical talk spurt is small.

Use of the half speech block reduces the delay to the beginning of a talk spurt by 20 msec. By starting a talk spurt with a half speech block, the overall time on the traffic channel is also reduced by 20 msec (corresponding to the first 20 msec interval typically needed to start up a chain interleaving sequence. By using a half speech block for the last speech frame of a talk spurt, which is relatively unimportant to the intelligibility of the talk spurt, the overall time on the traffic channel is reduced by an additional 20 msec (for a total of 40 msec). This is accomplished by eliminating the need to transmit the last 20 msec portion of the last valid speech frame.

The half speech block could also be used in the middle of a talk spurt to free up room to transmit a frame of control information. This is called "dim-and-burst" signaling as opposed to "blank-and-burst" signaling, which replaces an entire speech frame with a frame of control information. This "dim-and-burst" concept is introduced as a new associated control channel below.

Initial Burst of a Talk Spurt

In GSM, interleaving must begin on a radio block boundary, which occurs every 20 msec. Since every talk spurt is specifically assigned to a traffic channel, it is not necessary to maintain this 20 msec granularity. Allowing a talk spurt to begin on any burst improves the average delay to the beginning of a talk spurt by approximately 5 msec for half-rate channels, since the assignment granularity is reduced from 20 msec to 10 msec. The average improvement for full-rate channels is approximately 7.5 msec, since the assignment granularity is reduced from 20 msec to 5 msec.

AMR VAD and Hangover

The current AMR VAD and hangover interval are not designed to provide optimal performance in a system with statistical multiplexing of speech. They are both candidates for further study to reduce the average length of talk spurts without significantly increasing the rate of occurrence of talk spurts (which would cause an increase in load on the RT control channels). For example, it should be possible to reduce the hangover interval from 7 frames to a lower number such as 2 or 3. It is not yet known how this would impact control channel load or the occurrence of speech clipping.

Data Traffic Channel Design Principles

The data traffic channels are designed for full compatibility with the speech traffic channels, while reusing the MCS1 through MCS9 channel coding schemes defined for EGPRS.

Interleaving

For full-rate data channels, the interleaving is 0123/4567 block interleaving as defined in EGPRS. There is no need to deviate from EGPRS since the TBF has exclusive use of the channel until it is explicitly reassigned.

For half-rate data channels, the interleaving is 0246/1357 block interleaving, where each data block is interleaved over 4 consecutive odd or even bursts (alternate bursts).

Compatibility with Half-Duplex Mobiles

As in the half rate speech section, half-rate data traffic channels have the same advantages in statistical multiplexing efficiency as half-rate speech traffic channels.

Headers

Since the entire channel (either full-rate or half-rate) is dedicated to a TBF for the length of a data spurt, there is no need for additional header beyond what is in existing EGPRS. The USF is unused and could be redefined for other purposes. The TFI is similarly unused in this approach as defined, but has potential value for additional data multiplexing options if replaced with the ARI and/or TBFI, as defined in section 0.

Initial Burst of a Talk Spurt

As mentioned above, data channels may begin a data spurt on any assigned burst, offering the same improvement in delay to the beginning of the data spurt as for a talk spurt.

Traffic Channel Definition

The following traffic channels are defined.

Downlink Traffic Channel for Full Rate Speech (DTCH/FS). This channel comprises an entire time slot with eight burst chain interleaving. This channel uses GMSK modulation and unequal error protection.

Downlink Traffic Channel for Half Rate Speech (DTCH/HS). This channel comprises one half of a time slot on alternate bursts with four burst chain interleaving. Channel 1 on the time slot comprises even-numbered bursts, channel 2 comprises odd-numbered bursts. The modulation and coding schemes are to be specified.

Downlink Traffic Channel for Full Rate Data (DTCH/FD). This channel comprises an entire time slot with four burst block interleaving. EGPRS Phase I modulation and coding schemes (MCS1–MCS9) are used for the blocks. The USF is freed up.

Downlink Traffic Channel for Half Rate Data (DTCH/HD). This channel comprises one half of a time slot on alternate bursts with four burst block-interleaving. Channel 1 on the time slot comprises even-numbered bursts, channel 2 comprises odd-numbered bursts. EGPRS Phase I modulation and coding schemes (MCS1–MCS9) are used for the blocks (four alternate bursts). The USF is freed up.

Uplink Traffic Channel for Full Rate Speech (UTCH/FS). This channel comprises an entire time slot with eight burst chain interleaving. This channel uses GMSK modulation and unequal error protection.

Uplink Traffic Channel for Half Rate Speech (UTCH/HS). This channel comprises one half of a time slot on alternate bursts with four burst chain interleaving. Channel 1 on the time slot comprises even-numbered bursts, channel 2 comprises odd-numbered bursts. The modulation and coding schemes are to be specified.

Uplink Traffic Channel for Full Rate Data (UTCH/FD). This channel comprises an entire time slot with four burst block interleaving. EGPRS Phase I modulation and coding schemes (MCS1–MCS9) are used for the blocks.

Uplink Traffic Channel for Half Rate Data (UTCH/HD). This channel comprises one half of a time slot on alternate bursts with four burst block interleaving. Channel 1 on the time slot comprises even-numbered bursts, channel 2 comprises odd-numbered bursts. EGPRS Phase I modulation and coding schemes (MCS1–MCS9) are used for the blocks (four alternate bursts).

Half-rate Traffic Channel Structure

Half-rate traffic channels comprise either even-numbered bursts (channel 1) or odd-numbered bursts (channel 2) of a time slot. This even or odd burst allocation of a half-rate traffic channel is not changed in a multiframe. It is worth noting that for current GSM traffic channels, the burst allocation alternates every 13 frames within a multiframe between odd bursts and even bursts. This change in burst allocation is necessary for maximum compatibility with half-duplex mobiles.

For data traffic channels, there is no MSACCH, and all allocated bursts in the time slot are available for traffic.

Multiplexing of Speech and Data Traffic

Two different half-rate traffic channels (speech or data) may be assigned to the two different phases, i.e. odd-numbered bursts or even-numbered bursts, of a time slot. The speech traffic channels (half-rate or full-rate) are allocated to a speech user for the duration of a talk spurt. A simplified fixed allocation procedure allocates an entire data traffic channel (either full-rate or half-rate) continuously to a TBF for the duration of a data spurt.

There is no multiplexing with full-rate speech users during a talk spurt, or with full-rate data users during a data spurt. After a full-rate talk or data spurt ends, the corresponding time slot is available for allocation to a full-rate or half-rate voice or data TBF.

Real Time Control Channel Design

New RT control channels provide the fast resource allocation needed to perform statistical multiplexing of voice and real-time data services. A burst-based contention access procedure allows a MS camped on the RT control channel to signal for uplink resource whenever an uplink traffic flow transitions from inactive to active (e.g. when the next talk spurt starts for a speech user). The mobile's Access Request Identifier, ARI, is transmitted in the access burst, which allows the network to immediately perform contention resolution. The network also includes the ARI in single-burst fast assignment messages in the downlink. Fast retry with 5 msec granularity increases the robustness of the single burst access and fast assignment scheme. Fast reassignment and termination provides the network the ability to allocate and reallocate resources and satisfy the QoS of RT TBFs.

Control Channel Functions

The existing BCCH or PBCCH provides the broadcast information needed for the mobile to access the GERAN. The existing CCCH or PCCCH provide the capability to negotiate the attributes of the initial TBF and to communicate the parameters needed for access to the RT control channels. Once in a voice, RT data or NRT data TBF, the following functions are needed (unless an exception is listed).

Access Request

The mobile must have the ability to request uplink resources on behalf of a TBF.

Traffic and Control Channel Assignment

The network must have the ability to make traffic and control channel assignments (for both uplink and downlink resources) to the mobile.

End-of-TBF Control

The mobile must have the ability to request the network to end a particular TBF. The network must have the ability to direct a mobile to immediately terminate a TBF.

Acknowledgment of Network Directives

The mobile must have the ability to acknowledge traffic and control channel assignments and end-of-TBF directives to trigger any necessary retry procedures to assure rapid resource allocation.

Timing Advance and Power Control

The network must be able to signal to the mobile any necessary adjustments in timing advance and power control.

Handover Signaling

If a mobile has an established TBF for voice or RT data, it is eligible for handover procedures. In this case, the mobile is required to provide periodic neighbor cell measurement reports to the network. The network will send the necessary handover directives to the mobile as appropriate to maintain the mobile under control of the RT control channels during and after handover to minimize service disruption.

Negotiation of Additional TBFs

It must be possible for either the mobile or network to begin negotiation of additional TBFs while under control of the RT control channels, subject to the multi-slot capabilities of the mobile. In particular, it must be possible to establish a default data TBF for control signaling while under control of the RT control channels.

AMR Signaling

During a voice TBF, it must be possible for the network to send periodic AMR mode commands to the mobile. During a voice TBF outside of a downlink talk spurt, it must be possible for the network to send periodic SID information to the mobile.

During a voice TBF, it must be possible for the mobile to send periodic AMR mode requests to the network. During a voice TBF outside of an uplink talk spurt, it must be possible for the mobile to send periodic SID information to the network.

RLC Signaling

RLC signaling may include, for example, ack/nack messages, and BEP measurements.

During a data TBF in the process of communicating in the downlink direction, it must be possible for the mobile to send periodic RLC control messages to the network.

During a data TBF in the process of communicating in the uplink direction, it must be possible for the network to send periodic RLC control messages to the mobile.

If a data traffic channel has already been allocated to a TBF in a direction requiring transmission of an RLC control message, existing RLC procedures already allow RLC control messages to be freely multiplexed with RLC data frames.

Control Channel Design Principles

The key functions of the RT control channels that enable statistical multiplexing are fast access, assignment, and acknowledgment. The following principles assure the rapid performance of these functions.

Burst-Based Channels

All fast access, assignment, and acknowledgment channels use single burst messages. This assures high capacity, point-to-point transmissions for compatibility with beam steering and power control procedures, and fine temporal granularity, with a transmission opportunity every 5 msec.

Access Request Identifier

Each mobile is assigned an ARI as a unique identifier during access and assignment procedures on the RT control channels. By including the ARI in the access burst, the network performs contention resolution immediately rather than waiting for contention resolution procedures on a traffic channel, as in GPRS and EGPRS. The network may respond immediately with a single burst assignment message including the ARI.

Half-Rate and Full-Rate Channels

The fast access, assignment, and acknowledgment channels are typically allocated a full-rate channel with all the bursts in a given slot. As an alternative, these channels may also be allocated as half-rate channels using either all odd or all even bursts in a slot.

Note in particular that a fast access channel is completely allocated for contention access. The network does not broadcast USF to signal contention opportunities. Since there is no need to monitor USF, this saves up to 40 msec in waiting to perform an access attempt in certain situations.

Fast Retry

Since all full-rate access, assignment, and acknowledgment channels have 5 msec granularity, this allows for rapid retry of these procedures up to once every 5 msec. Half-rate channels have a 10 msec granularity. Even with a high error rate on these channels, access and assignment procedures can be performed quickly and efficiently. Note that frequency hopping is desirable on these channels to reduce or eliminate burst-to-burst fading correlation.

Fast Control Channel Assignment

The fast access, assignment, and acknowledgment channels are allocated at the establishment of a TBF, and continue to be used throughout the TBF unless they are reassigned.

Associated Control Channel Definitions

Several new associated control channels are defined to support the necessary control channel functions while the mobile is active on a traffic channel in the direction that control signaling is required.

Fast Associated Control Channel (FACCH)

A FACCH is associated with each traffic channel defined in 0. Thus the FACCH associated with the DTCH/FS is referred to as FACCH/DFS, for FACCH on a downlink full-rate speech channel. Other FACCH channels are named consistently. Standard FACCH coding as in GSM AMR bearer is used.

Dim-and-burst FACCH (DFACCH)

A DFACCH is associated with each traffic channel defined in 0. Thus the DFACCH associated with the UTCH/FS is referred to as DFACCH/UFS. Other DFACCH channels are named consistently.

DFACCH coding is for further study beyond the present invention.

Burst-Based FACCH (BFACCH)

A BFACCH is associated with each traffic channel defined in 0. Thus the BFACCH associated with the DTCH/FS is referred to as BFACCHIDFS. Other BFACCH channels are named consistently.

Burst based control messages are transmitted over BFACCH replacing single burst speech or data for fast access, assignment and acknowledgment while on a traffic channel. BFACCH is distinguished from speech or data traffic using a new training sequence or stealing bits. BFACCH channel coding is for further study.

Modified Slow Associated Control Channel (MSACCH)

A MSACCH is associated with each traffic channel defined in 0. Thus the MSACCH associated with the DTCH/FS is referred to as MSACCH/DFS. Other MSACCH channels are named consistently.

A MSACCH is a set of reserved bursts on a periodical basis and has the same structure as SACCH defined for GSM speech traffic channels.

Block based signaling messages, e.g. Neighbor Measurement Report, are transmitted over MSACCH.

Common Uplink Control Channel Definition

Fast Random Access Channel (FRACH)

A FRACH is designed to transmit single burst fast contention access messages. The traffic on the FRACH is isolated from the RACH and PRACH. Since the mobiles accessing on the FRACH are assumed to be time-aligned, the guard period on the FRACH burst is shorter and the message size can be larger. The maximum message length on the FRACH is TBD.

A FRACH comprises either a full time slot on all bursts (full-rate), or a half time slot on alternate bursts (half-rate).

Fast Acknowledgment Channel (FACKCH)

A FACKCH is designed to transmit single burst messages to acknowledge assignments and termination directives from the network. FACKCH transmissions occur in reserved bursts.

Single burst acknowledgment message is transmitted on FACKCH on a polled basis using a RRBP scheme. This permits multiple burst-based assignment/acknowledgment sequences to be completed within a 20-msec block period and improves the speed and reliability of real-time statistical multiplexing.

A FACKCH comprises either a full time slot on all bursts (full-rate), or a half time slot on alternate bursts (half-rate).

Uplink Periodic Reservation Channel (UPRCH)

An UPRCH is used to transmit signaling messages that need to be updated on a periodic basis, e.g. SID_Update and Neighbor Measurement Report. It is possible that a traffic channel is relinquished (e.g. when a talk spurt ends) before a signaling message (e.g. spans 480 ms) is transmitted completely on the MSACCH. An UPRCH is designed for MSACCH signaling continuity when an uplink traffic channel is released.

An UPRCH is released at the assignment of an uplink traffic channel, and is reassigned each time at the release of an uplink traffic channel.

A UPRCH comprises either a full time slot on all bursts (full-rate), or a half time slot on alternate bursts (half-rate). The network reserves one of every 26 bursts on a full-rate UPRCH for each voice TBF not in an uplink talk spurt. 26 voice TBFs can simultaneously share a full-rate UPRCH.

Uplink Block Message Channel (UBMCH)

An UBMCH is designed for block (4 bursts) messages, e.g. RLC signaling, using polled reservation bursts in a RRBP-like scheme.

Common Downlink Control Channel Definition

Fast Assignment Channel (FASSCH)

A FASSCH is designed to transmit single burst assignment and termination messages when there is no downlink traffic allocated to the MS. Different messages are used to assign downlink traffic channels, downlink control channels, uplink traffic channels, and uplink control channels.

A FASSCH comprises either a full time slot on all bursts (full-rate), or a half time slot on alternate bursts (half-rate).

Downlink Periodic Reservation Channel (DPRCH)

A DPRCH is used to transmit signaling messages that need to be updated on a periodic basis, e.g. SID_Update, timing advance, and power control. It is possible that a traffic channel is relinquished (e.g. when a talk spurt ends) before a signaling message (e.g. spans 480 ms) is transmitted completely on the MSACCH. A DPRCH is designed for MSACCH signaling continuity when a downlink traffic channel is released.

A DPRCH is released when the downlink traffic channel is assigned, and reassigned each time at the release of the downlink traffic channel.

A DPRCH comprises either a full time slot on all bursts (full-rate), or a half time slot on alternate bursts (half-rate). The network reserves one of every 26 bursts on a full-rate DPRCH for each voice TBF not in a downlink talk spurt. 26 voice TBFs can simultaneously share a full-rate DPRCH.

Downlink Block Message Channel (DBMCH)

A DBMCH is designed for block (4 bursts) messages, e.g. RLC signaling, handover directives, etc.

Multiplexing of Common Control Channel

The FRACH, FACKCH, UPRCH, FASSCH, and DPRCH may be either full-rate or half-rate control channels. A full-rate control channel uses all bursts in each multiframe. A half-rate control channels uses either every odd or every even burst in each multiframe.

These channels are not multiplexed on the same full-rate or half-rate channel.

Two different half-rate control or traffic channels may be assigned to the two different phases (all odd or all even) of a slot. Note that the burst allocation for half-rate control channels is compatible with and identical to the burst allocation for half-rate traffic channels.

The multiplexing of DBMCH and UBMCH with other common control channel is FFS.

Overview of Real Time TBF Operation

The definition of TBF (GPRS Phase 1) is enhanced to support RT services. Each RT TBF may be bi-directional (e.g. speech) or unidirectional (e.g. best effort data). The initial establishment of a RT TBF is carried on a PCCCH or CCCH. Each RT TBF has an associated TBF profile. The negotiation of a RT TBF profile during TBF setup includes the QoS requirements and the protocol stack supported by the RAB.

Additional information that is exchanged during initial TBF setup includes the following:

A temporary MS Access Request Identifier, ARI, is allocated by the network and is sent to the MS.

Carrier information (including frequency-hopping sequence) is communicated to the MS, either by broadcast message over PBCCH/BCCH or explicit signaling. The details are FFS.

TBF identifier (TBFI) is assigned to the MS per requested TBF.

TBF Inactivity Timer is negotiated for RT and NRT data TBFs. It is optional for RT speech TBF (FFS).

Once a RT TBF is established, the MS is assigned a set of RT control channels, namely FRACH, FACKCH, UBMCH and UPRCH for uplink signaling, and FASSCH, DBMCH and DPRCH for downlink signaling and control. An UPRCH (or a DPRCH) may be reassigned each time an UTCH (or a DTCH) is released. The rest of the control channels, i.e. FRACH, FACKCH and UBMCH for uplink, and FASSCH and DBMCH for downlink, do not need to be reassigned for the duration of the TBF.

The uplink and/or downlink traffic associated with the RT TBF is activated independently using fast access and fast assignment procedures. Additional RT and NRT TBF(s) can be negotiated and established on the RT control channel(s).

An established bi-directional TBF has the following 4 states: TBF Inactive, DL Active, UL Active, and DL and UL Active. The state transition diagram for a single bidirectional RT TBF is shown in FIG. 6. The state transitions for a unidirectional RT TBF and NRT TBF (as defined in EGPRS Phase 1) are a subset of the states and allowable transitions associated with bi-directional RT TBF.

RT TBF State Definition

An established bidirectional RT TBF has four states, as shown in FIG. 7. Channel allocation is also shown in FIG. 6 (Table 1).

RT TBF State: DL Inactive

In this state, there is no uplink or downlink traffic channel assigned to the MS for the TBF. The MS and the network may independently initiate uplink and downlink traffic, set up a new TBF, end a current TBF, or end all TBFs associated with the MS. The network may also reassign common control channels to the MS.

A timer may be associated with this state per RT TBF, which allows the MS to be in TBF established state for a configurable time after the downlink and uplink traffic end. This avoids re-negotiation of the RT TBF profile, should downlink or uplink traffic flow resume within a short period of time.

RT TBF State: DL Active

In this state, the MS is assigned a downlink traffic channel associated with the RT TBF. Downlink single burst messages are transmitted using BFACCH. Other downlink signaling and control messages are transmitted using FACCH and/or MSACCH.

Uplink signaling and control messages are carried on uplink common channels assigned to the MS, which are shared among parallel TBFs the MS may have established.

New TBFs may be initiated on the RT control channels.

RT TBF State: UL Active

In this state, the MS is assigned an uplink traffic channel associated with the RT TBF.

Uplink single burst messages are transmitted using BFACCH. Other uplink signaling and control messages are transmitted using FACCH and/or MSACCH.

Downlink signaling and control messages are carried on downlink common control channels assigned to the MS, which are shared among parallel TBFs the MS may have established.

New TBFs may be initiated on the RT control channels.

RT TBF State: DL and UL Active

In this state, the MS is assigned an uplink traffic channel and a downlink traffic channel associated with the RT TBF.

Both downlink and uplink single burst messages are transmitted using BFACCH. Other signaling and control messages are transmitted using FACCH and/or MSACCH.

New TBFs may be initiated on the RT control channels.

Procedures Associated with Single RT TBF State Transition

A set of procedures is defined to perform the state transitions associated with an RT TBF. FIG. 7 (table 2) shows the procedures associated with each single RT TBF state transition and the applicable states involved. The definitions and message flows for the procedures are further described below.

Control Messages

Uplink Signaling and Control Messages

FIG. 8 (table 3) provides a summary of the uplink signaling and control messages and the control channels used.

Access Request

This single burst message is sent over BFACCH if an UTCH is allocated; otherwise it is sent over FRACH. Its usage and contents are further described in Section 0.

Acknowledge to Assignment

This set of single burst messages is sent over BFACCH if an UTCH is allocated; otherwise they are sent over FACKCH. Their usage and contents are further described later in the section devoted to that issue.

AMR Mode Request

AMR Mode Request (2 bits) is sent in-band if an UTCH is allocated. Otherwise, it is sent over UPRCH, multiplexed with other periodic signaling messages, e.g. SID Update and Neighbor Measurement Report. The details of the multiplexing of these messages are FFS.

SID Update

Sid Update is sent over UPRCH, multiplexed with AMR Mode Request and Neighbor Measure Report.

Neighbor Measurement Report

It is sent over MSACCH if a UTCH is allocated; otherwise, it is sent over UPRCH, multiplexed with other periodic signaling messages, e.g. SID Update and AMR Mode Request.

RLC Signaling

RLC signaling is sent over a UTCH or UBMCH, according to EGPRS Phase 1 RLC procedures.

End TBF Request

This single burst message is sent on BFACCH or FRACH. Its usage and contents are further described below.

Downlink Signaling and Control Messages

FIG. 9 (table 4) provides a summary of the downlink signaling and control messages, and the RT control channels used.

Assignment

All Assignment messages are burst based. They are sent over BFACCH if a DTCH is allocated; otherwise they are sent over FASSCH. Their usage and contents are further described below.

AMR Mode Command

AMR Mode Command (2 bits) is sent inband if a DTCH is allocated. Otherwise, it is sent over DPRCH, multiplexed with other periodic signaling messages, e.g. SID Update and Timing Advance. The details of the multiplexing of these messages are FFS.

SID Update

SID_Update is sent over DPRCH, multiplexed with AMR Mode Command and Timing Advance.

Handover Directives

Handover Directives are sent over FACCH if a DTCH is allocated; otherwise they are sent over DBMCH.

RLC Signaling

RLC signaling is sent over a DTCH or DBMCH, according to EGPRS Phase I RLC procedures.

Timing Advance

Timing Advance is sent over MSACCH if a DTCH is allocated to the MS; otherwise it is sent over DPRCH.

Power Control

Power Control is sent over MSACCH if a DTCH is allocated to the MS; otherwise it is sent over DPRCH.

End TBF Command

This single burst message is sent on BFACCH or FASSCH by the network to terminate a single TBF or all TBFs established by the MS. Its contents are further described below.

Downlink Burst Message Contents

FIG. 10 (table 5) provides a summary of downlink burst messages and their content.

Assign UTCH

This message is used to allocate an UTCH per specified TBF (identified by TBFI). The ARI field is included for fast contention resolution.

Deferred Assign UTCH

This message is used to delay assignment of UTCH for the specified TBF (identified by TBFI). The delay field indicates the period for which the mobile must wait for an assignment of uplink resource before it may try again.

Assign DTCH

This message is used to allocate a DTCH per specified TBF (identified by TBFI). RRBP field is used to indicate the reserved burst for sending the acknowledgment.

Assign UPRCH

This message is used to allocate an UPRCH to an MS for uplink periodic signaling when there is no UTCH assigned to the MS. The UPRCH is reassigned when an UTCH is released and the periodic uplink signaling on the MSACCH needs to continue on the UPRCH.

Assign DPRCH

This message is used to allocate a DPRCH to an MS for downlink periodic signaling when there is no DTCH assigned to the MS. The DPRCH is reassigned when a DTCH is released and the periodic downlink signaling on the MSACCH needs to continue on the DPRCH.

Assign FRACH

This message is used to allocate an uplink FRACH to an MS for fast contention access. A FRACH is assigned to an MS at the initial TBF setup and is usually not changed for the duration of the established TBF.

Assign FACKCH

This message is used to allocate an uplink FACKCH to an MS for sending acknowledgment on reserved bursts when polled. A FACKCH is assigned to an MS at the initial TBF setup and is usually not changed for the duration of the established TBF.

Assign FASSCH

This message is used to allocate a downlink FASSCH to an MS for monitoring assignment messages. A FASSCH is assigned to an MS at the initial TBF setup and is usually not changed for the duration of the established TBF.

End TBF Command

This message is used by the network to terminate one TBF (identified by TBFI) or all TBFs (TBFI=0) established by a MS.

Uplink Burst Message Content

FIG. 11 (table 6) provides a summary of uplink burst messages and their contents.

Access Request

This message is used by an MS to request for UTCH per specified TBF (identified by TBFI).

Acknowledge UTCH/DTCH/ UPRCH/DPRCH/FRACH/ FACKCH/FASSCH

The MS uses this set of messages to acknowledge traffic and control channel assignments.

Acknowledge End TBF

The MS uses this message to acknowledge an End TBF Command.

End TBF Request

The MS uses this message to request for termination of a TBF or all TBFs (TBFI=0) established by the MS.

Information Element Definition

| IE | Name | Length (bits) | Description |
|---|---|---|---|
| ARI | Access Request Identifier | 9 | Uniquely identifiers each MS on RT control channel |
| DMT | Downlink Message Type | 4 | Identifies downlink burst message type |
| UMT | Uplink Message Type | 4 | Identifies uplink burst message type |
| TBFI | TBF Identifier | 2 | Identifies 1 of 3 possible TBFs in use by a MS; 0 identifies all TBFs for a MS |
| RRBP | Relative Reserved Burst Period | 2 | Offset to reserved uplink burst for acknowledgment of assignment |
| CID | Carrier Identifier | 4 | Identifies up to 16 carriers in current cell; Carrier descriptions provided on PBCCH or PCCCH |
| CTS | Carrier Time Slot | 3 | Time slot number on assigned carrier. |
| PH | Phase | 2 | Indicates full-rate or half-rate, and odd bursts or even bursts |
| SD | Start Delay | 1 | Indicates whether to start on $1^{st}$ or $2^{nd}$ eligible burst of a radio block |
| OFF | Offset | 5 | Frame number in each 26-multiframe for periodic allocation |
| delay | Delay | 6 | The number of 40 msec intervals a mobile must wait before it may again try to request an uplink traffic channel |
| reason | Reason Code | 2 | Further status for End TBF command/request |

The BBAA methods described above has been applied to a system for access and assignment to real-time and non-real-time services in GERAN as follows. The following four subsections describe the four key procedures needed to perform real-time scheduling of uplink and downlink traffic channel resources (UTCH and DTCH, respectively) in a system that statistically multiplexes voice, real-time data, and non-real-time data. Each flow of data is called a TBF (temporary block flow). Access requests occur on a fast random access channel (FRACH). Traffic channel assignments occur on either a common fast assignment channel (FASSCH) if the mobile is not on a downlink traffic channel, or on a burst-based fast associated control channel (BFACCH) that steals a single burst from ongoing downlink traffic. One of the four bursts of a traffic channel block is blanked and replaced with a burst-based control message. Acknowledgments to assignments occur on either a common fast acknowledgment channel (FACKCH) if the mobile is not on an uplink traffic channel, or on a BFACCH. At the end of an uplink (downlink) talk spurt or data spurt, the network reallocates an uplink (downlink) periodic reservation channel [UPRCH (DPRCH)] to allow continuity of slow associated control signaling between the mobile and the network.

Start Uplink Traffic (SUT)

Figure 12:
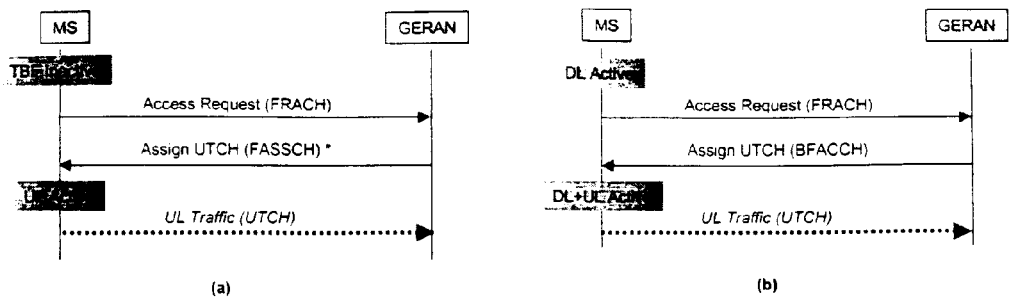
FIG. 12 illustrates the temporary block flow of messages between a mobile station and a base station of a network using GARAN techniques during a start uplink traffic procedure.

As shown in FIG. 12, a mobile station (MS) uses the SUT procedure to start an uplink traffic flow associated with a TBF. The uplink traffic flow is directed to a base station which is part of a network using GERAN methods.

End Uplink Traffic (EUT)

Figure 13:
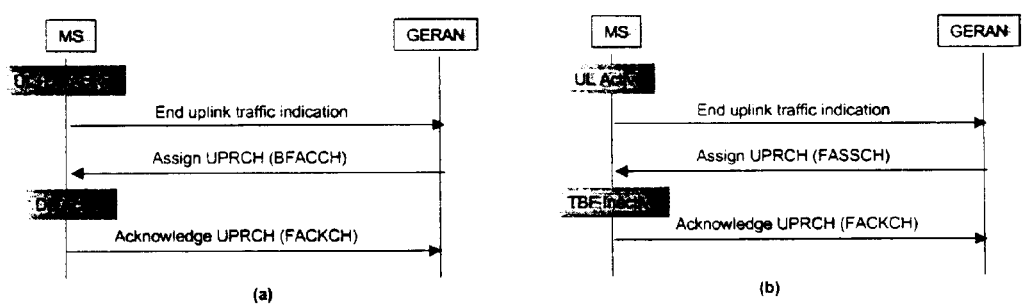
FIG. 13 illustrates the temporary block flow of messages between a mobile station and a base station of a network using GERAN techniques during an end uplink procedure.

As shown in FIG. 13, the network and the MS use the EUT procedure to terminate an uplink traffic flow associated with a TBF.

Start Downlink Traffic (SDT)

Figure 14:
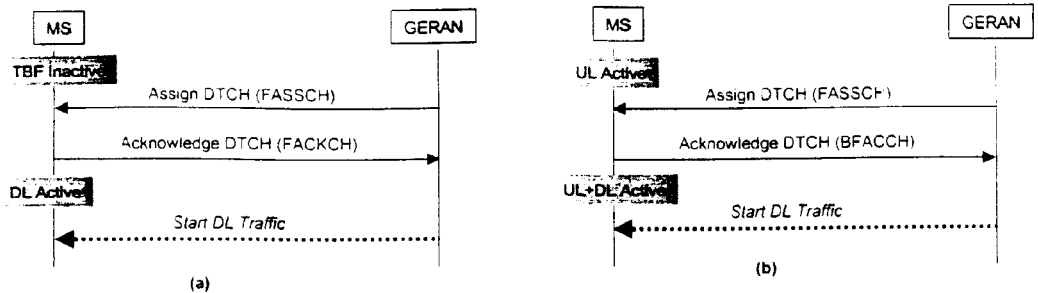
FIG. 14 illustrates the temporary block flow of messages between a mobile station and a base station of a network using GERAN techniques during a start downlink procedure.

As shown in FIG. 14, the network uses the SDT procedure to start a downlink traffic flow associated with a TBF.

End Downlink Traffic (EDT)

Figure 15:
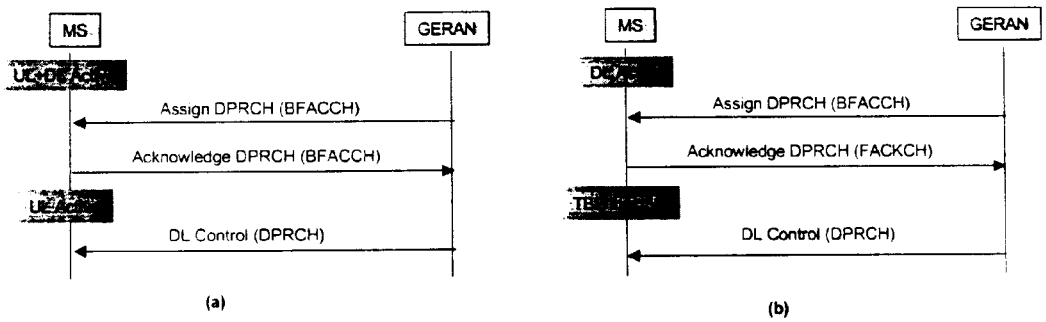
FIG. 15 illustrates the temporary block flow of messages between a mobile station and a base station of a network using GERAN techniques during an end downlink procedure.

As shown in FIG. 15, the network uses the EDT procedure to terminate a downlink traffic flow associated with a TBF.

Reassign Uplink Traffic (RUT)

Figure 16:
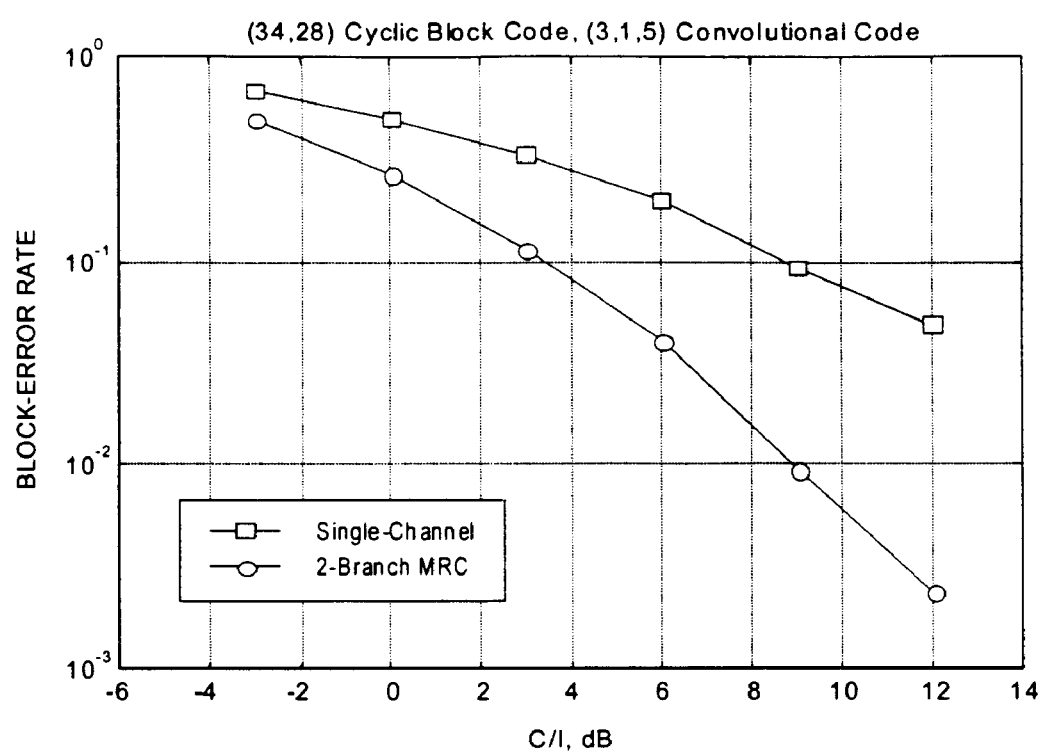
FIG. 16 is a plot of simulated results of link performance of single burst based transmission of communications according to the present invention and to a prior technique.

As shown in FIG. 16, the network uses the RUT procedure to assign a new uplink traffic channel to the MS associated with a TBF.

Reassign Downlink Traffic (RDT)

Figure 17:
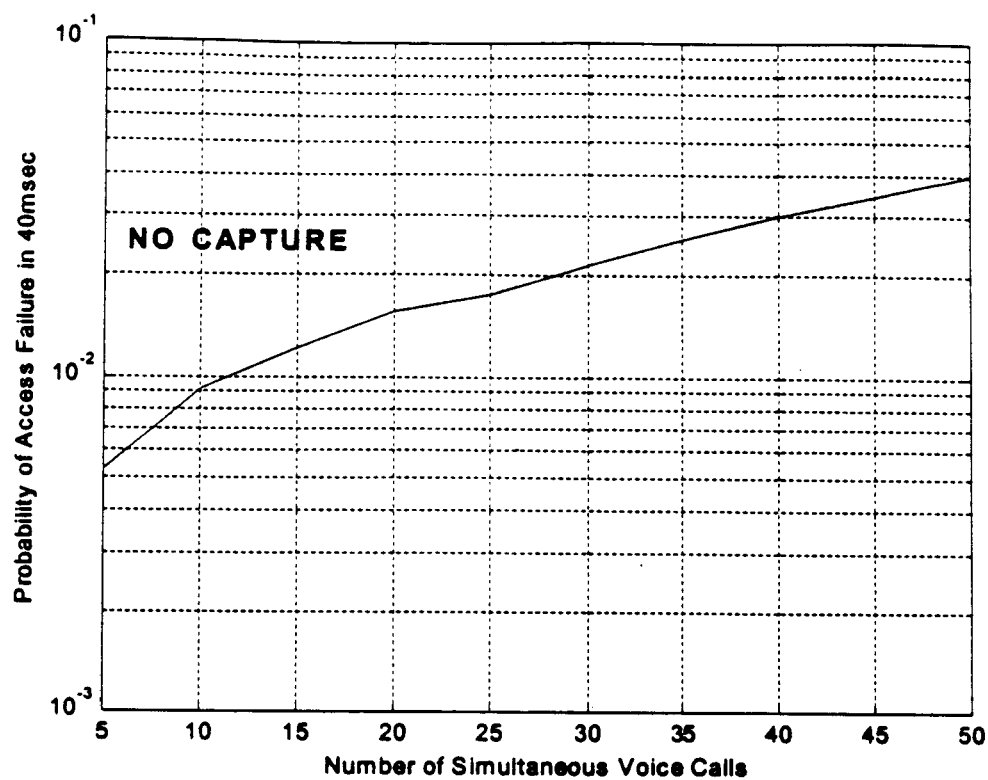
FIG. 17 is a plot of simulated results for the no capture case according to the present invention.

As shown in FIG. 17, the network uses the RDT procedure to assign a new downlink traffic channel to the MS associated with a TBF.

Reassign Uplink Control (RUC)

Figure 18:
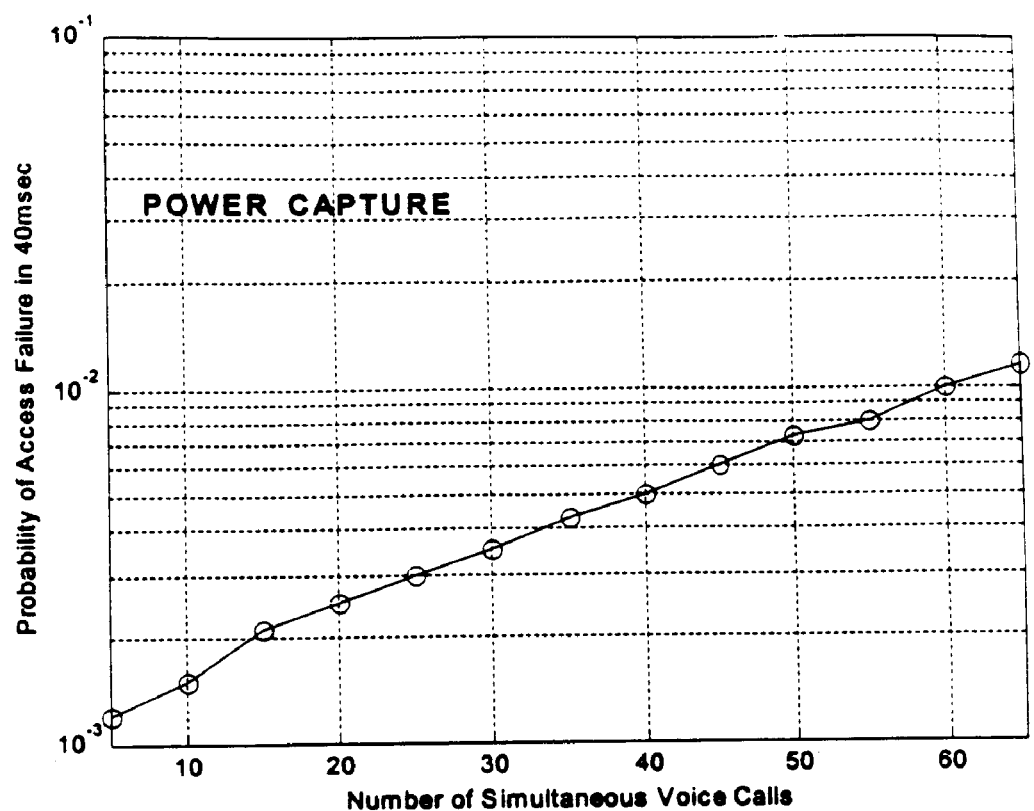
FIG. 18 is a plot of simulated results for the power capture case according to the present invention.

As shown in FIG. 18, the network uses the RUC procedure to assign a new uplink control channel to the MS.

Reassign Downlink Control (RDC)

Figure 19:
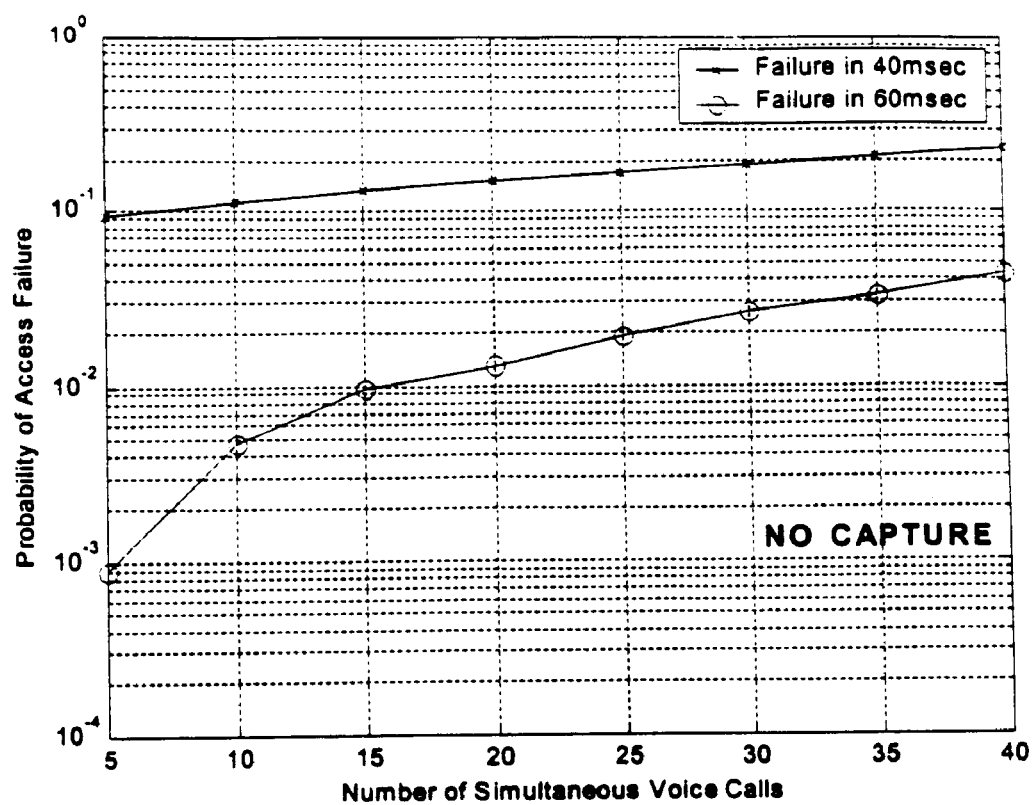
FIG. 19 is a plot of simulated results for the (3,8) algorithm for the no capture case according to the present invention and to a prior technique.

As shown in FIG. 19, the network uses the RDC procedure to assign a new downlink control channel to the MS.

End TBF (ET)

Figure 20:
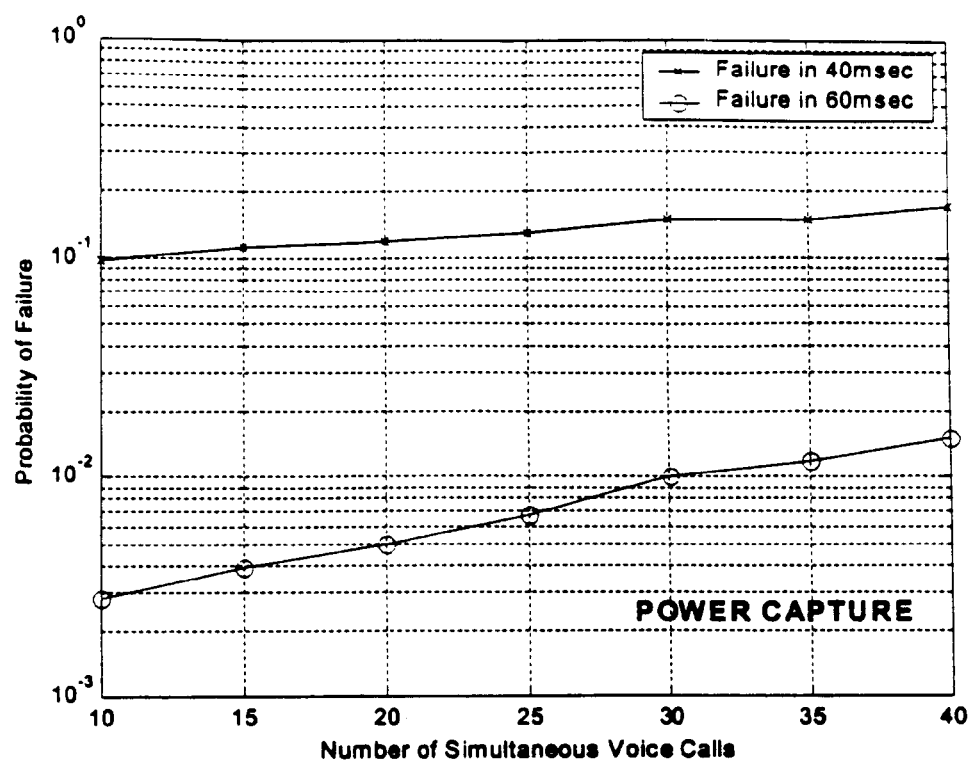
FIG. 20 is a plot of simulated results for the (3,8) algorithm for a power capture case according to the present invention.

As shown in FIG. 20, the ET procedure is used to terminate a TBF or all TBFs. The End TBF procedure may also be used in Error cases for all other scenarios. Whenever error occurs during Assignment, either the MS or the network may abort the on-going procedure using End TBF messages.

Performance of Half Block Speech System

A full speech block system having the following full speech block design for a half-rate channel was considered in simulation: a 7.4 kbps AMR vocoder mode (Class 1a bits=48, Class 1b bits=48, Class 2 bits=52), equal error protection (EEP) including CRC assumed on Class 1a bits and punctured rate 1/3 convolutional coding, and QPSK modulation.

A half speech block system according to an embodiment of the present invention having the following half speech block design for a half-rate channel was also considered in simulation: a 4.75 kbps AMR vocoder mode, equal error protection (EEP) including CRC assumed on Class 1a bits and a punctured rate 1/3 convolutional coding, and QPSK modulation.

Figure 21:
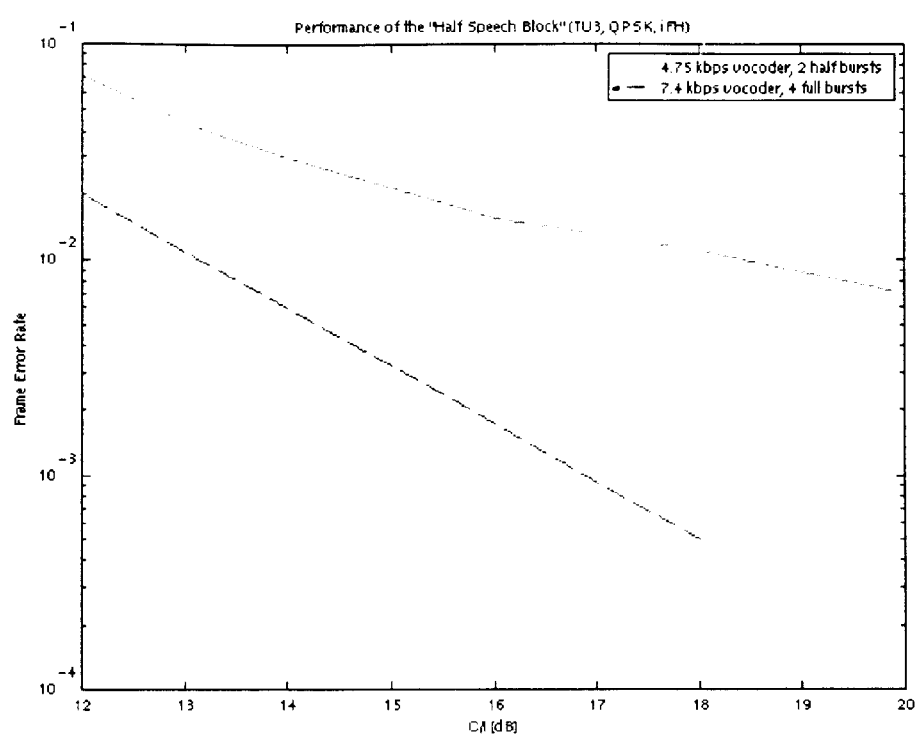
FIG. 21 is a plot of simulated results comparing block error rates for half speech blocks and full speech blocks.

Simulations were performed for the following case and the results are shown in FIG. 21. The simulated case for FIG. 21 had typical urban (TU) conditions and ideal frequency hopping assumed. From FIG. 21 it can be seen that for the same signal to interference ratio, the half speech block system has a block error rate about 4 times higher than the full speech block system. It is possible to compensate for this increased error rate by transmitting the half speech block with increased power. An additional 4–6 dB of transmitter power can compensate for the loss in coding. The impact of such increases on overall interference and channel quality is small since this increased power is transmitted infrequently. Moreover, an increase in the block error rate from 1% to 4% for the first speech block in a talkspurt resulted in a barely perceptible impact on voice quality. The use of dim-and-burst signaling according to the present invention actually resulted in an improvement in voice quality over the currently used blank-and burst FACCH used in full speech systems.

Thus, it will now be understood that there has been disclosed a new, advantageous system and method to reduce speech delay and improve voice quality using half speech blocks in wireless communications. While the invention has been particularly illustrated and described with reference to preferred embodiments thereof, it will be understood by those skilled in the art that changes in form, details and applications may be made therein. It is accordingly intended that the appended claims shall cover all such changes in form, details and applications which do not depart from the true spirit and scope of the invention.

What is claimed is:

1. A wireless speech system comprising:

means for chain interleaving of a plurality of full speech frames; and means for replacing at least one of said plurality of full speech frames with a corresponding half speech frame that has been encoded and interleaved over half of one of said plurality of full speech frames, wherein speech is encoded using a multiple rate speech codec and the half speech frame uses a different channel coding rate than the full speech frame replaced by said half speech frame.

2. The system of claim 1, wherein said half speech frame is encoded differently to mitigate loss of speech quality due to the halving the number of information bits and interleaving depth.

3. The system of claim 1 wherein the half speech frame represents the same duration of speech as the full speech frame it replaces.

4. A wireless speech system comprising:

means for chain interleaving of a plurality of full speech frames; and means for replacing at least one of said plurality of full speech frames with a corresponding half speech frame that has been encoded and interleaved over half of one of said plurality of full speech frames, wherein the half speech frame is encoded and interleaved over the last half of the interleaving period of the replaced speech frame; and wherein the half speech frame corresponds to the beginning of a talk spurt, and where nothing is transmitted during the first half of the interleaving period of the replaced full speech frame.

5. The system of claim 4, wherein the half speech frames correspond to the end of a talk spurt, and where nothing is transmitted during the last half of the interleaving period of the replaced full speech frame.

6. The system of claim 4, wherein the half speech frame corresponds to the beginning of a talk spurt, where channel resources are assigned for transmission of speech at the beginning of each talk spurt, and where two speech frames may become available before resource assignment is completed and transmission starts.

7. The system of claim 6, wherein the system allows recovery of resource assignment delay of up to half the interleaving depth.

8. A wireless speech system comprising:

means for chain interleaving of a plurality of full speech frames; and means for replacing at least one of said plurality of full speech frames with a corresponding half speech frame that has been encoded and interleaved over half of one of said plurality of full speech frames, wherein the half speech frame is realized using a lower rate speech codec than the speech frame it replaces.

9. A wireless speech system comprising:

means for chain interleaving of a plurality of full speech frames;

means for replacing at least one of said plurality of full speech frames with a corresponding half speech frame that has been encoded and interleaved over half of one of said plurality of full speech frames; and an adaptive multi-rate vocoder for encoding said half speech block with a lower speech rate mode.

10. The system of claim 9, wherein said adaptive rate vocoder is located at a base station.

11. The system of claim 9, wherein said adaptive rate vocoder is located in a mobile station.

12. The system of claim 9, wherein an adaptive rate vocoder is located at a base station and a second adaptive rate vocoder is located in a mobile station communicating with said base station.

* * * * *